May 12, 1964
W. R. POLANIN
3,132,532
SLACK ADJUSTER ASSEMBLY
Filed Aug. 9, 1960
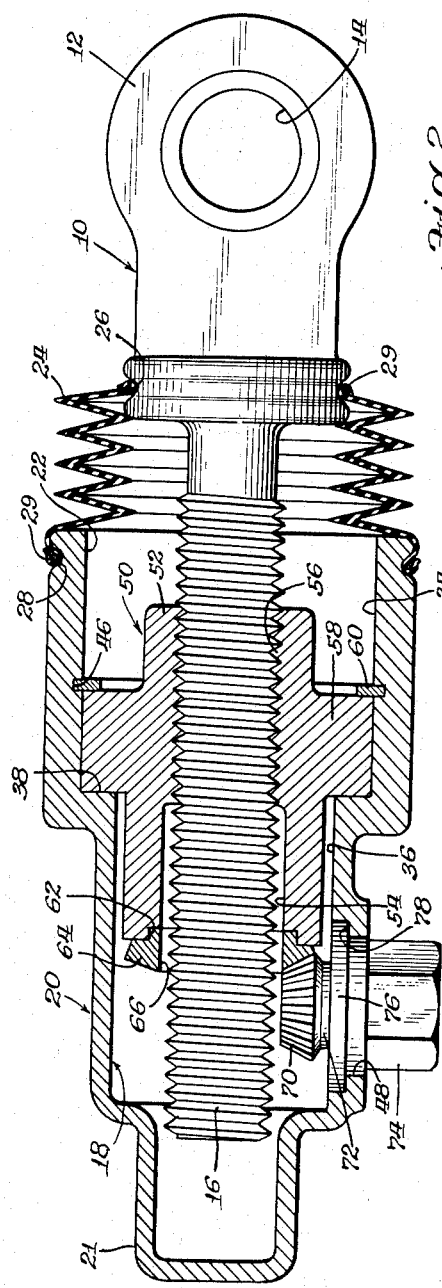
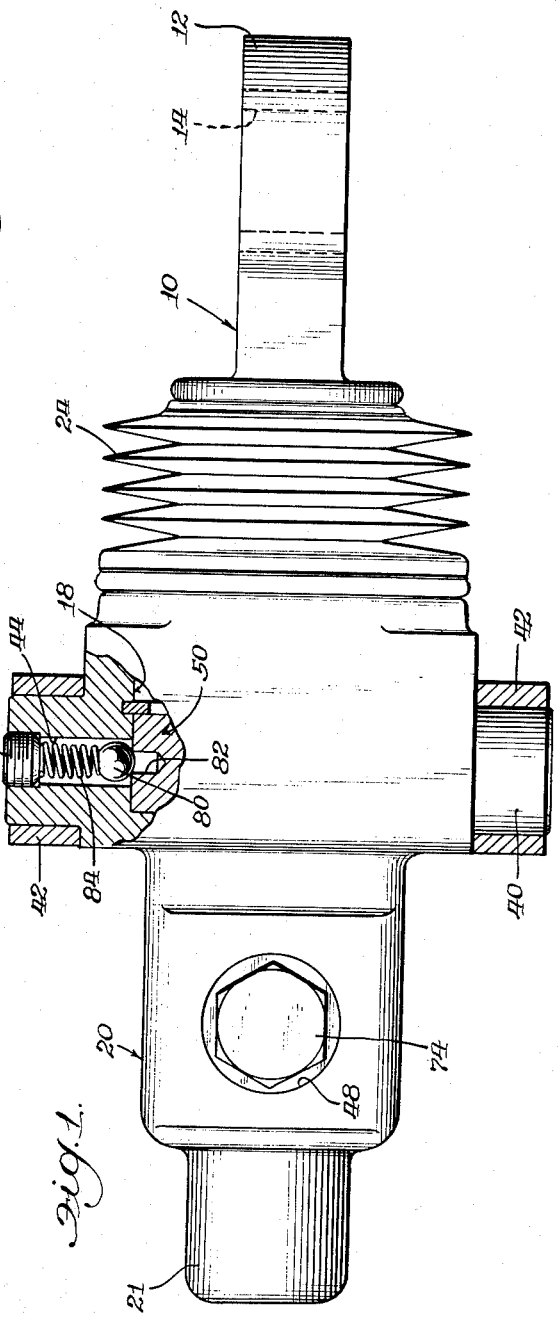
INVENTOR.
Walter R. Polanin
BY Walter J. Schlegel, Jr.
Atty.
Witness:
Richard W. Carpenter _United States Patent Office_ 3,132,532
Patented May 12, 1964

3,132,532
SLACK ADJUSTER ASSEMBLY
Walter R. Polanin, Chicago, Ill., assignor to Amsted Industries Incorporated, Chicago, Ill., a corporation of New Jersey
Filed Aug. 9, 1960, Ser. No. 48,435
8 Claims. (Cl. 74—586)

This invention relates to brakes and more particularly to a slack adjuster assembly for railway brake rigging.

The invention comprehends an improved manual slack adjuster assembly, of the general class disclosed in United States Patent Number 2,425,979, and which is particularly adaptable for use in a self-contained brake arrangement of the type disclosed in my United States Patent Number 3,040,843.

In conventional manually operable slack adjusters, such as those of the above mentioned patent and application, adjustment is usually accomplished by the rotation of an adjusting nut located at one of the assembly and rotatable about a horizontal axis extending parallel to the longitudinal axis of the vehicle.

Such an arrangement, although practical and convenient for standard clasp brake arrangements like that shown in the previously mentioned patent, requires more space than is available in many of the more compact self-contained brake arrangements in current use today.

It is therefore an object of this invention to provide an improved slack adjuster assembly for railway brake rigging which can be adjusted from any position between the ends of the assembly.

A more specific object of the invention is to provide a slack adjuster assembly wherein the operative portions of the screw and nut are completely enclosed, and wherein their relative movement can be regulated by the rotation of a nut disposed at right angles to the longitudinal axis of the assembly.

These and other objects of the invention will be apparent from an examination of the following description and drawings, wherein:

FIGURE 1 is a fragmentary bottom plan view, with portions of the structure shown in horizontal section, of a slack adjuster assembly embodying features of the invention; and FIGURE 2 is a side elevation, partly in vertical section, of the structure illustrated in FIGURE 1.

It will be understood that certain elements have been omitted from certain views where they are better illustrated elsewhere.

Referring now to the drawing for a better understanding of the invention, it will be seen that the slack adjuster assembly includes a screw, indicated generally at 10, having at one end a non-threaded portion or head 12 presenting an eye 14 for connection in the usual manner (not shown) to one of a pair of related brake elements (not shown). At its other end the screw has a cylindrical threaded portion 16 which is disposed to extend into a generally cylindrical cavity or bore 18 of a housing 20.

The bore of the housing is closed at one end by wall 21 and has an opening 22 at the opposite end for receiving the threaded portion of the screw.

In order to provide a water-tight connection between the screw and housing, the head of the screw and the open end of the housing may be interconnected by a cylindrical expandable rubber boot 24 which may have its opposite ends secured within cylindrical grooves 26 and 28 in the outer surfaces of the screw head and housing, respectively. The end portions of the boot may be maintained in the groove by wires or clips 29.

The housing is generally cylindrical in shape with the end portion of the housing which receives the screw 10 being slightly larger in circumference than the remainder of the housing. Thus, the housing cavity 18 is divided into a pair of co-axial larger and smaller diameter sections 34 and 36, respectively, which are separated by an annular shoulder or abutment 38.

Extending outwardly from opposite sides of the housing are a pair of axially aligned trunnions 40, preferably provided with external bushings 42, for connection in the usual manner (not shown) to the other of the related brake elements (not shown).

Rotatably mounted within larger section 34 of the housing cavity is a generally cylindrical collar 50 having a body 52 through which extends axially a central cylindrical bore 54, a portion of which is threaded at 56 for engagement with threaded portion 16 of screw 10. The body of the collar has extending radially outwardly therefrom, adjacent one end thereof, an annular flange 58 which is disposed within section 34 of housing cavity 18 between abutment 38 and a resilient retainer ring 60 removably positioned within an annular groove 46 of the housing. Thus, the collar is free to rotate within the housing and its rotation will, by virtue of its threaded connection to the screw, effect the axial or linear movement of the screw relative to the housing so as to change the distance between the brake elements which are interconnected by the slack adjuster device. The abutment 38 and the retainer ring 60 are spaced from each other a distance approximately equal to the width of the collar flange 58 to engage opposite sides of the flange and thereby prevent its axial movement relative to the housing.

The opposite end of collar body 52 is disposed within section 36 of housing cavity 18 and has in its end a recess 62 within which is secured a portion of a bevel gear 64 having a central opening 66 axially aligned with a collar bore 54 for receiving the threaded portion of the screw.

Also disposed within section 36 of the housing cavity at right angles to gear 64 is a smaller bevel gear or pinion 70 which engages gear 64. Gear 70 has an integral shaft or body 72 which extends through an opening 48 in the housing and has at its opposite end a head, an adjusting nut 74 adapted to fit a wrench so that the head can be rotated from without the housing to rotate both bevel gears and thereby turn the collar and thereby effect the axial movement of the screw relative to the housing. Head 74 may be provided with an annular flange 76 which abutably engages a shoulder 78 located on the housing adjacent opening 48 to prevent accidental removal of gear 70 from the housing.

Each of the trunnions may be provided with an axially extending latch hole 44 for receiving a ball type latch or detent 80 adapted to seat in any one of a plurality of circumferentially spaced recesses 82, presented by flange 58 of the collar, to prevent the accidental rotation of the collar in the housing. Each latch ball 80 is urged into engagement with a related recess 82 by a latch spring 84 which in turn is held in position by a set screw 86 threadably received within the latch hole.

To assemble the device, bevel gear 70 is inserted into the open end of the housing cavity and turned until its head 74 projects out of opening 48. The collar, with bevel gear 64 secured thereto, is then inserted into housing cavity 18 and retaining ring 60 is positioned within groove 46 of the housing. The threaded portion of the screw is then introduced into the housing cavity and then threaded into the collar and the boot is applied to the end of the housing and the screw head to close off the open end of the housing cavity.

After the housing and screw have been connected to their related brake elements, the relative position between the elements can be changed merely by rotating head 74 of bevel gear 70. It will be noted that because the bevel gears engage each other at right angles, adjusting head 74 can be located between the ends of the housing as to permit adjustment of the device from above or below or from the sides of the housing, depending on the location of opening 48, so that the over-all length of the device is effectively shortened for its convenient use in compact brake arrangements.

I claim:

1. A slack adjuster comprising a housing having an internal chamber open to the atmosphere at only one end thereof, a screw having its longitudinal axis substantially coaxial with that of said housing, said screw projecting from said end of the housing and having a portion externally thereof with means for connection to an associated brake part, threads on said screw in said chamber, a flexible means having a watertight sealed removable connection to the housing and another watertight sealed removeable connection to the rod between said portion and said threads in the housing, said flexible means closing said end of the chamber, said housing having an annular shoulder in said housing facing said end thereof, a collar seated against said shoulder and having a substantially cylindrical perimeter slideably and rotatably engaged with a complementary cylindrical surface of the housing in said chamber, a resilient ring removably received within a groove of said housing and having an annular surface facing said shoulder, said annular surface slideably engaging said collar to snugly confine the latter between said shoulder and said annular surface, said cylindrical surface extending from said groove to said end of the chamber to accommodate insertion and removal of the collar when the ring and flexible means are removed from the housing, an annular flange on said collar having an inner diameter greater than the outer diameter of the threads and having an outer diameter spaced from said housing, said collar being in threaded engagement with said threads radially inwardly of said cylindrical surface, an annular bevel gear mounted on the end of said flange remote from said threaded engagement and having an internal diameter spaced from and surrounding the screw, another bevel gear rotatable on an axis substantially prependicular to the first-mentioned axis and engaged with the first-mentioned gear for actuation thereof, said bevel gears being disengageable from each other when the collar is removed from said end of said chamber, means externally of said chamber extending through an opening of the housing and connected to said other gear for actuation thereof, means for sealing said opening against passage of dust into said chamber, and means on the housing externally of said chamber for connection to another associated brake part.

2. A slack adjuster comprising a housing having on opposite sides thereof coaxial trunnions adapted to be received within openings of associated brake rigging, a member having a first portion extending into the housing and another portion externally thereof having connecting means for connection to other associated brake rigging, actuating means in the housing operatively connected to said first portion for moving said connecting means toward and away from said trunnions, an annular shoulder in said housing facing one end thereof, said actuating means seated against said shoulder and having a substantially cylindrical perimeter slideably and rotatably engaged with a complementary cylindrical surface of the housing, retaining means within said housing to prevent withdrawal of said actuating means and first portion, said trunnion having a substantially cylindrical opening defining a detent housing substantially concentric with the longitudinal axis of said trunnion, said detent housing communicating with said actuating means, said actuating means having a plurality of circumferentially spaced recesses in said cylindrical perimeter, said spaced recesses being aligned axially around said actuating means and said spaced recesses also being substantially aligned with the longitudinal centerline of said trunnion opening when said actuating means is seated against said shoulder of said housing, a ball in said detent housing engageable with one of said spaced recesses in said actuating means, a coil spring in said detent housing outwardly from said ball, and a set screw threaded into an opening in the outward end of said detent housing to hold said coil spring in compression on said ball and subsequently holding said ball in one of said spaced recesses to releasably engage said actuating means to prevent accidental actuation thereof, the diameter of said set screw being at least as great as that of the ball and spring to accommodate their removal from the last-mentioned opening after the screw has been removed therefrom.

3. A slack adjuster comprising a housing having on opposite sides thereof coaxial trunnions adapted to be received within openings of associated brake rigging, a member having a portion extending into the housing and another portion externally thereof having connecting means for connection to other associated brake rigging, actuating means in the housing operatively connected to the first-mentioned portion for moving said connecting means toward and away from said trunnions, means projecting externally of the housing for operating said actuating means, means for retaining the actuating means in said housing, and detent means mounted in a complementary opening in at least one of said trunnions and releasably engaged with said actuating means to prevent accidental actuation thereof, an opening in the outer end of said one trunnion, said detent means being smaller than said last-mentioned opening for passage therethrough during assembly and disassembly of said detent means, and readily removable means connected to said one trunnion closing the outer end of said last-mentioned opening.

4. A slack adjuster comprising a housing, an elongated adjusting member extending into the housing for movement relative thereto axially along the longitudinal axis of said member, said member having connecting means externally of the housing for associated brake means, a trunnion on said housing having an axis substantially perpendicular to the first-mentioned axis for reception within an opening of other associated brake means pivotally moveable relative to the housing on said trunnion axis, actuating means in the housing operatively connected to said member for moving said connecting means toward and away from said trunnion along the first-mentioned axis, means projecting externally of the housing for operating said actuating means, means for retaining the actuating means in said housing, and detent means mounted in a complementary opening of said trunnion and releasably engaged with said actuating means to prevent accidental actuation thereof.

5. A slack adjuster comprising a housing having means projecting therefrom for connection to associated brake rigging, a member having a first portion extending into the housing and another portion externally thereof having connecting means for connection to other associated brake rigging, actuating means in the housing operatively connected to said first portion for moving said connecting means toward and away from said projecting means, and detent means packaged in said projecting means and releasably engaged with said actuating means to prevent accidental actuation thereof, an opening in said projecting means at a point remote from its connection to the housing, said detent means being removable through said last-mentioned opening, and readily removable means connected to the projecting means for closing said last-mentioned opening and thereby holding the detent means in engagement with said actuating means.

6. A slack adjuster comprising a housing having an internal chamber, a member having a first portion extending into said chamber and another portion externally thereof having connecting means for connection to an associated brake component, said housing having an annular shoulder in said housing facing said end thereof, a collar threaded on said member and seated against said shoulder and having a substantially cylindrical perimeter slideably and rotatably engaged with a complementary cylindrical surface of the housing in said chamber, a resilient ring removeably received within a groove of said housing and having an annular surface facing said shoulder, said annular surface slideably engaging said collar to sungly confine the latter between said shoulder and said annular surface, means for rotating the collar, said cylindrical surface extending without diminution of its diameter from said groove to said end of the chamber to facilitate insertion and removal of the collar with said resilient retaining ring removed from said chamber, and means on said housing externally of said chamber for connection to another associated brake part.

7. A slack adjuster comprising a housing having an internal chamber, a screw projecting from said chamber of the housing and having a portion externally thereof with means for connection to an associated brake part, threads on said screw in said chamber, flexible means having a dust-tight sealed removeable connection to the housing and another dust-tight sealed removeable connection to the rod between said portion and said threads in the housing, said flexible means closing said end of the chamber, an annular shoulder in said housing facing said end thereof, a collar seated against said shoulder and having a substantially cylindrical perimeter slideably and rotatably engaged with a complementary cylindrical surface of the housing in said chamber, a resilient ring removeably received within a groove of said housing and having an annular surface facing said shoulder, said annular surface slideably engaging said collar to snugly confine the latter between said shoulder and said annular surface, an annular flange on said collar having an inner diameter greater than the outer diameter of the threads and having an outer diameter spaced from said housing, said collar being in threaded engagement with said threads radially inwardly of said cylindrical surface, a first annular bevel gear operatively mounted on the end of said flange remote from said threaded engagement and having an internal diameter spaced from and surrounding the screw, a collar actuating means comprising a second bevel gear rotatable on an axis substantially perpendicular to the axis of the first bevel gear and engaged with said gear for actuation thereof, said second gear having an integral shaft extending through a shaft opening in the housing and having at its opposite end a head smaller than the shaft opening and adapted to fit an operating tool so that said second gear may be operated from without the housing, said integral shaft extending through said opening in the housing to have an annular flange thereon, said housing having an annular shoulder located adjacent said opening, said annular shoulder and annular flange being engageable within said opening to prevent withdrawal of said collar actuating means through the outward end of said opening, said second bevel gear engaging said first bevel gear so as to prevent inward movement of said collar actuating means when said collar is retained by said resilient ring, and means on said housing external from said chamber for connection to another associated brake part, said cylindrical surface extending without diminution of its diameter from said shoulder to the end of said housing remote therefrom, whereby when the ring and flexible means are removed from the housing, the screw and collar may be pulled from said end thereof thereby disengaging said bevel gears from each other, the length of said second gear, its shaft, and its head being less than the diameter of said housing at said shaft opening, whereby when the screw and collar have been removed from said end of said housing, the second gear, together with its shaft and head, may be pushed through the shaft opening and removed from said end of the housing.

8. A slack adjuster comprising a housing open at one end thereof and having connection means for associate brake rigging, a structure extending into said end of the housing and having connecting means externally thereof for other associated brake rigging, adjusting means in the housing operatively connected to said structure for moving the connecting means toward and away from the connection means, a member mounted in an opening of the housing between its ends and having means to prevent passage of said member outwardly through said opening and to prevent passage of dust into the opening, said member being operatively connected to said adjustment means for actuation thereof and having means engageable with the adjusting means to prevent said member from passing through the opening into the housing until the adjusting means has been removed therefrom, readily removable means retaining said adjusting means in the housing, and means on the member externally of the housing for actuating the member to thereby actuate the adjusting means, said member being shorter than the width of said housing at said opening, whereby when said adjusting means are removed from said end of the housing said member may be pushed through said opening into the housing and may be removed from said end of the housing.

References Cited in the file of this patent

UNITED STATES PATENTS

| | | |
|---|---|---|
| 1,935,607 | Anderson | Nov. 21, 1933 |
| 2,348,734 | Freeman | May 16, 1934 |
| 2,453,855 | Oliver | Nov. 26, 1948 |
| 2,870,873 | Muller | Jan. 27, 1959 |
| 2,936,055 | Kassnel | May 10, 1960 |
| 2,937,725 | Newell | May 24, 1960 |
| 2,969,222 | Sears | Jan. 24, 1961 |
| 3,008,344 | Dracka | Nov. 14, 1961 |
| 3,019,663 | Breunich | Feb. 6, 1962 |

FOREIGN PATENTS

| | | |
|---|---|---|
| 530,830 | Belgium | Apr. 14, 1954 |
| 505,020 | Italy | Dec. 15, 1954 |

UNITED STATES PATENT OFFICE
CERTIFICATE OF CORRECTION

Patent No. 3,132,532                                  May 12, 1964

Walter R. Polanin

It is hereby certified that error appears in the above numbered patent requiring correction and that the said Letters Patent should read as corrected below.

Column 2, lines 2 and 3, for "divided into a pair of co-axial larger and smaller diam- mainder of the housing. Thus, the housing cavity 18 is" read -- mainder of the housing. Thus, the housing cavity 18 is divided into a pair of co-axial larger and smaller diam- --; column 6, line 45, for "May 16, 1934" read -- May 16, 1944 --.

Signed and sealed this 22nd day of September 1964.

(SEAL)
Attest:

ERNEST W. SWIDER                                EDWARD J. BRENNER
Attesting Officer                                      Commissioner of Patents